US 6,646,221 B2

(12) United States Patent
Wang et al.

(10) Patent No.: US 6,646,221 B2
(45) Date of Patent: Nov. 11, 2003

(54) METHOD FOR REPAIRING RESISTANCE SPOT WELDS IN ALUMINUM SHEET MATERIALS

(75) Inventors: Pei-Chung Wang, Troy, MI (US); Peter C. Sun, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 3 days.

(21) Appl. No.: 10/122,534

(22) Filed: Apr. 15, 2002

(65) Prior Publication Data

US 2003/0192863 A1 Oct. 16, 2003

(51) Int. Cl.[7] .............................................. B23K 11/16
(52) U.S. Cl. ...................................................... 219/118
(58) Field of Search ............................. 219/117.1, 118, 219/119, 120

(56) References Cited

U.S. PATENT DOCUMENTS 4,633,054 A  * 12/1986 Patrick et al. .............. 219/118

FOREIGN PATENT DOCUMENTS

JP           1-18583        * 1/1989    ........... B23K/11/10

* cited by examiner

*Primary Examiner*—M. Alexandra Elve
*Assistant Examiner*—Kevin P. Kerns
(74) *Attorney, Agent, or Firm*—Kathryn A. Marra

(57) ABSTRACT

A method for repairing resistance spot welds formed between joined pieces of aluminum alloy sheet metal, such as vehicle body parts. The repair method includes resistance welding where an existing undersized spot weld is enlarged by applying electric current flow through the aluminum alloy sheets in the region around the existing defective weld. A pair of donut shaped electrodes may be used. Resistance to the current flow generates heat within the weld region. A new weld nugget is formed around the periphery of the existing weld and merges with it. The weld region is cooled and a repaired composite spot weld is formed.

10 Claims, 1 Drawing Sheet

METHOD FOR REPAIRING RESISTANCE SPOT WELDS IN ALUMINUM SHEET MATERIALS

TECHNICAL FIELD

The present invention relates generally to a method of repairing welded joints in aluminum sheet materials and, more specifically, to a method of repairing undersized aluminum resistance spot welds.

BACKGROUND OF THE INVENTION

Resistance spot welding of aluminum alloy sheets is often implemented in the production of automotive body parts, such as deck lid panels, body frame members, or the like. These aluminum sheet alloys often have compositions in the Aluminum Alloy 5xxx and 6xxx series. Several spot welds in the assembly of automotive body members and closure panels are common. In the joining of aluminum sheets to make these parts, the sheets are held in place and aligned while opposing copper electrodes are pressed against opposite sides at the weld location. Electrical current is passed from one electrode through the underlying sheets to the other electrode. Heat generated by resistance to the flow of electric current through the work pieces melts some of the metal at their interfaces. Current flow is stopped and the sheets are held together until the molten nugget cools and solidifies to bond the sheets at the weld spot. The electrodes are then retracted.

Often the cooperating electrodes have sheet contacting tips that are flat or dome shaped for applying local pressure to the sheets and for good electrical contact. The electrodes are often cooled for their own protection and to help dissipate heat from the welding region when current flow has been stopped. A spot weld of suitable size and quality depends significantly on the proper alignment and pressure of the electrode tips and the duration and amount of current flow. Weld quality also depends upon the surface condition of the electrode face. Usually the size of the weld nugget corresponds to the contact area of the electrode faces. It is not unusual to make several spot welds in the assembly of automotive body members and closure panels.

A suitable weld nugget is generally round (like the weld electrode tip) in plan view and oval in vertical cross section. Spot welding operations are often conducted in a highly repetitive operation and sometimes problems or variations occur in the control or execution of the process and undersized weld nuggets are produced. Misapplication of welding current or unsuitable positioning of an electrode tip on the surface of the aluminum sheet can produce undersized, weak welds. Usually undersized welds must be repaired and thus, a practical repair process for spot welds in aluminum sheet materials is urgently needed.

For aluminum resistance spot welding, unlike resistance spot welding of stainless steel, the welding heat is primarily created due to the electrical resistance of aluminum oxide present in the aluminum alloy material. But the oxide is dispersed or depleted once the first weld has been made. Thus, it is ineffective to try to re-weld an existing weld nugget using the same resistance spot welding practice and equipment because the previously used current path is now too conductive to melt additional metal. Similarly, attempting to repair a weld by adding additional spot welds around the weak spot is not practical and if its new welds are too close to the original one, current shunting will often create new undersized welds.

Thus, it is an object of the present invention to provide a practical and efficient method of repairing undersized aluminum spot welds thus increasing the size and durability of the existing weld.

SUMMARY OF THE INVENTION

The present invention provides a method of repairing an undersized aluminum resistance spot weld formed between two aluminum alloy sheets. In accordance with the invention, a supplemental weld is formed around the periphery of the undersized nugget to form a composite weld body between the sheets having suitable size and strength. The original undersized weld nugget is generally round in plan view. In this case, the supplemental weld is a donut shaped or toroidal shaped nugget that surrounds the original nugget and, preferably, is fused to it to make a more or less unitary weld nugget of desired size.

The practice of the method requires electrodes sized and shaped to form the supplemental weld nugget. For example, a pair of copper welding electrodes with donut shaped tips is placed, one on each of the outer surfaces of the defectively welded aluminum alloy sheets. The tips of the opposing electrodes are positioned on the sheet surfaces directly over the electrically resistive aluminum alloy surrounding the undersized weld nugget.

The copper welding electrodes are pressed against the aluminum sheets at the welding region for good electrical contact. Once secured, an electric weld current is supplied that flows between the electrodes, through the aluminum sheets, to the sheet-to-sheet contact interface area located at the welding region. Thermal energy is created at contact surfaces of the aluminum sheets caused by resistance of the aluminum oxide and aluminum alloy to the electric current. A portion of the aluminum alloy sheets melts between the contact points of the electrodes, thus creating a new weld nugget around the undersized one. This new weld nugget is of a donut shape, in conformance with the size and shape of the electrode tips, and it surrounds the periphery of the existing undersized spot weld.

The welding current is suitably alternating current (AC), typically and suitably 60 Hz, or direct current (DC). Often DC for welding is produced by rectification of 60 cycle AC and such DC has the cyclic nature of the AC. After a suitable duration of current flow, e.g., 5 to 8 cycles of AC (60 Hz) or cyclic DC, current flow is stopped and the molten supplemental weld nugget is allowed to fuse onto and around the existing undersized weld. While maintaining electrode pressure on the aluminum alloy sheets, the composite weld nugget is allowed to cool and solidify. As a result, a repaired and properly sized aluminum spot weld is thus formed.

This and other aspects of the present invention will become apparent from a detailed description of specific embodiments that follow.

DESCRIPTION OF THE PREFERRED EMBODIMENT

Figure 1:
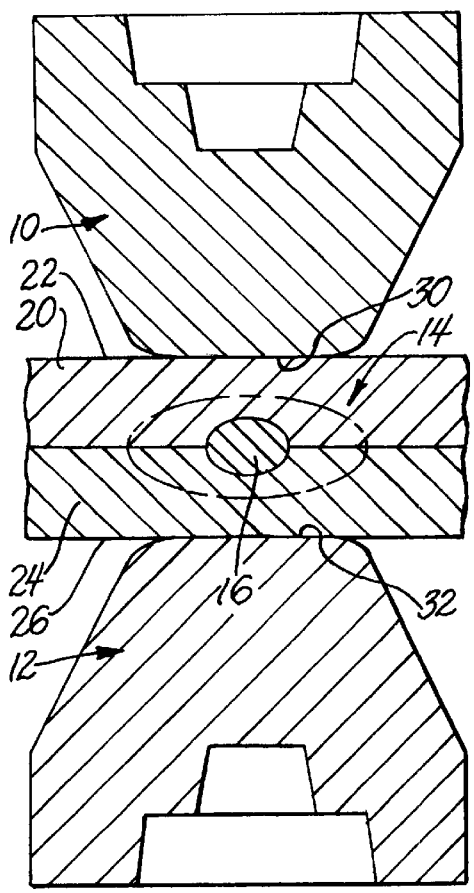
FIG. 1 is a cross sectional side view showing a representative opposing electrodes/sheet metal layers relationship for resistance spot welding using a pair of dome shaped electrodes.

A cross sectional side view of a typical resistance spot welding setup for joining aluminum alloy sheets is shown in FIG. 1. In this instance an undersized weld nugget 16 has been inadvertently formed. A first water cooled, preferably copper, welding electrode 10 is placed in contact with the top surface 22 of upper aluminum sheet 20 directly over intended weld region 14. A second, substantially identical, welding electrode 12 is similarly placed on the bottom surface 26 of the lower aluminum sheet 24 directly under weld region 14. Opposing electrodes 10, 12 are aligned and positioned against aluminum sheets 20, 24 close together at the weld region 14. By way of example, an electrode force of about 600 to 1200 lbs is applied in pressing together the aluminum sheets 20, 24 at the weld region 14.

A welding current produced by conventional electrical resistance welding gear is delivered to the welding electrodes. A cyclic DC current produced by rectifying 60 cycle AC current may be used. For example, a weld current in the range of 20 kA to 35 kA is momentarily delivered to weld region 14 by electrodes 10, 12. The current travels between electrode tips 30, 32 in a direct flow path through the aluminum sheets to their contacting surfaces at weld region 14. Heat is generated in the flow path and concentrated in weld region 14 from the resistance of the faying surface and metal pieces 20, 24 to the electric current. As the electrode force maintains close contact positioning of the two sheets, a fused ball of aluminum alloy material, known as a weld nugget, 16 is formed.

Molten weld nugget 16 is formed in a fraction of a second after 2 to 10 cycles of the DC current. Generally, a welding operation sequence comprises four major time segments; squeeze time, welding time, holding time and off time. The squeeze time is an interval of delay between initiation of the process and the application of the welding current. The weld time is the interval during which current flows through the circuit. The holding time is the interval after current flow is stopped in which the electrode force is applied to the weld regions as the welding heat is dissipated and nugget 16 is solidified. The off time is the interval from the end of the holding time until the beginning the squeeze time for the next cycle.

Weld nugget 16 that is formed from resistance spot welding is generally round. The electrode faces commonly used in resistance spot welding are either domed or flat faced. The round welding electrode faces or tips 30, 32 that are shown in FIG. 1 are dome faced. Because of the localization of heat between the round electrodes, weld nugget 16 is normally, oval in cross section, and round in plan view, like the electrode faces. Misapplication of welding current, misapplication of the electrodes on the surfaces of aluminum sheets 20, 24, or the like, sometimes creates a weld nugget that is deficient in size and shape. The undersized weld nugget 16 must be repaired before the joined aluminum sheets can be used for its intended purpose.

The repair method of the present invention uses a resistance spot welding technique comprising two electrodes having faces shaped to direct current through electrically resistive sheet material around the defective weld nugget 16. In this example of an undersized round weld, donut shaped electrode tips are used. The repair method of the present invention requires an electrode with an electrode face that is larger than the existing undersized weld and is shaped in conformance with the contours of the periphery of the weld. An electrode 102 preferred for the repair method of the present invention is shown in FIG. 2 and will be referred to as donut shaped.

Figure 3:
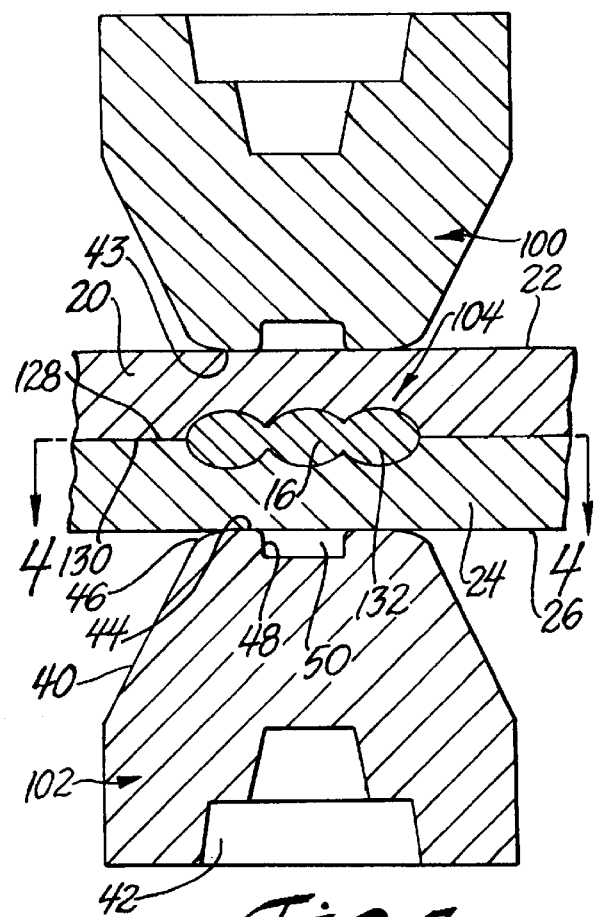
FIG. 3 is a cross sectional side view of a welding assembly of the present invention showing a method of repairing an existing undersized spot weld using a pair of cone shaped, donut tipped electrodes.
Figure 2:
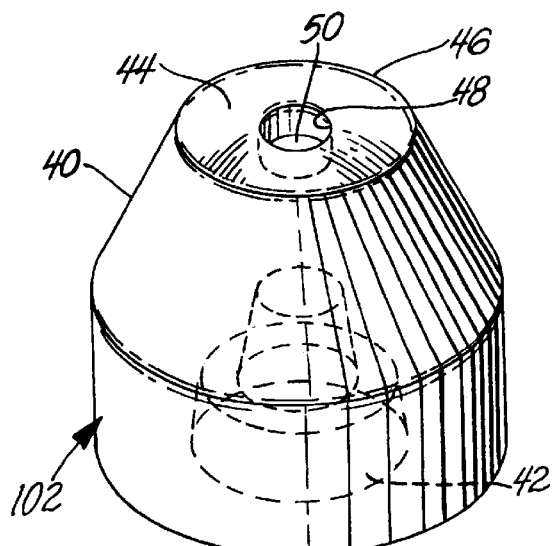
FIG. 2 is an oblique view of a donut shaped welding electrode tip.

Electrode 102 is shown in FIG. 2. It comprises a conductive, round copper alloy body 40 and a chamber 42 for cooling water. Body 40 is tapered toward a suitable welding tip or face 44. As specified above, the face 44 is shaped like a donut or ring and sized to surround the region of the existing undersized weld. The diameter of inner ring 48 of donut face 44 is about the same as the diameter of the periphery of undersized weld nugget 16, as shown in FIGS. 1 and 3. The diameter of outer ring 46 of donut face 44 is comparable to the exterior rim of a desired supplemental or repair weld nugget to be formed around nugget 16. It is desired that the donut hole 50 be at least as large as the existing undersized weld nugget 16.

The method of repair of the present invention is shown in FIG. 3. Electrodes 100, 102 firmly engage sheets 20, 24 on surfaces 22, 26 at locations above and below weld region 104. Electrode 100 may be identical to electrode 102 shown in FIG. 2. The firmly positioned electrodes 100, 102 press aluminum sheets 20, 24 together for electrical contact and positional stability. An electrode force of about 200 pounds (0.89 kN), suitably 180 to 220 pounds, is applied to surfaces 22, 26 of aluminum sheets 20, 24 toward weld region 104.

An electric weld current of about 28 kA, suitably about 25 to 30 kA, is supplied to weld region 104 by electrodes 100, 102 during the supplemental weld formation. The current flow is directed through the electrically resistive oxide of the aluminum alloy sheet material at weld region 104 surrounding undersized nugget 16. The generated heat melts aluminum alloy sheets 20, 24 where they are pressed together at inside surfaces 128, 130. Current flow is directed by doughnut shaped tips 43, 44 to the periphery of weld nugget 16 in weld region 104. Current flow is not directed through the original weld nugget 16. The heat generated in weld region 104 forms the supplemental, donut shaped weld nugget 132.

Figure 4:
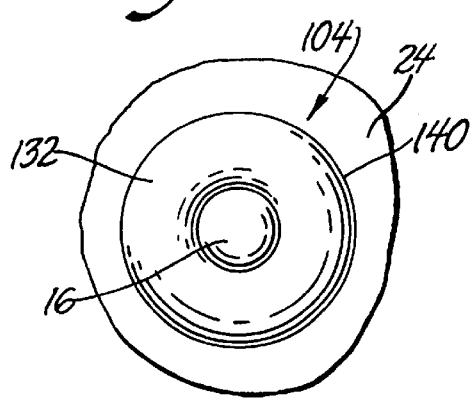
FIG. 4 is a top view (4—4 of FIG. 3) of a repair weld nugget merged with the original undersized weld nugget.

Weld nugget 132 is thus shaped as a ring in conformance with the current flow from electrode faces 43, 44. The outer diameter of nugget ring 132 is, for example, approximately 6 mm, almost identical to that of the outer rim of the donut shaped electrode face. Respectively, the inner diameter of nugget ring 132 is approximately 3 mm, almost identical to that of the inner rim of the donut shaped electrode face. As welding current is applied to weld region 104, a molten aluminum alloy ring is formed around undersized weld nugget 16. Current flow is stopped and the molten ring solidifies as weld nugget 132. It is preferred that heating is continued long enough for nugget 132 to merge with nugget 16 in a unitary composite nugget as illustrated in FIGS. 3 and 4. A new, enlarged weld nugget 140 is formed, as shown in FIG. 4. FIG. 4 is a plan view of the composite nugget 140 with the upper sheet 20 removed. As seen in the figure, weld nugget 140 is embedded in lower sheet 24 and is a composite of nuggets 16 and 132.

In this example, the method of repair requires about 5 to 8 cycles of DC current to produce a suitable repair weld for the present invention. After completion of this DC flow, application of welding current is ceased and the weld is allowed to solidify. The result is a strong resistance spot weld 140 of suitable shape and size.

While the practice of the invention has been described in terms of a preferred embodiment it is recognized that other embodiments could readily be adapted by those skilled in the art. According the scope of the invention is limited only to the proper scope of the following claims.

What is claimed is:

1. A method of enlarging an undersized spot weld nugget formed within adjacent portions of two aluminum alloy sheets lying flatly against each other, said sheet portions including outer sheet surfaces, and inner sheet surfaces that include said undersized weld nugget, said weld nugget having a peripheral edge and said aluminum alloy sheets comprising electrically resistive aluminum alloy material around said peripheral edge, said method comprising:

pressing two welding electrodes in electrical contact against respective outer sheet surfaces, said electrodes being aligned in opposition to each other and overlying opposite sides of the peripheral edge of said weld nugget, said electrodes each having a sheet contacting tip sized and shaped to overlie said electrically resistive material around said peripheral edge of said nugget;

passing a welding current between said electrode tips through said resistive material to melt aluminum alloy sheet material within said outer surfaces and around the periphery of said undersized nugget; and stopping said current flow and cooling said melted material to form a supplemental weld nugget around the peripheral edge of said undersized weld nugget.

2. A method as recited in claim 1, comprising melting sheet metal material sufficiently close to the peripheral edge of said undersized nugget to solidify with said undersized nugget to form a composite nugget including said undersized nugget and said supplemental nugget.

3. A method as recited in claim 1 in which said undersized nugget has a round peripheral edge and said electrodes have donut shaped tips contacting said sheets.

4. A method as recited in claim 2 in which said undersized nugget has a round peripheral edge and said electrodes have donut shaped tips contacting said sheets.

5. A method as recited in claim 1 in which said current is a DC current produced by rectification of a 60 Hz AC current.

6. A method as recited in claim 2 in which said current is a DC current produced by rectification of a 60 Hz AC current.

7. A method as recited in claim 5 in which said DC current is passed through said resistive material for about 5 to 8 cycles.

8. A method as recited in claim 6 in which said DC current is passed through said resistive material for about 5 to 8 cycles.

9. A method as recited in claim 5 in which said DC current is about 25 to 30 kA.

10. A method as recited in claim 6 in which said DC current is about 25 to 30 kA.

* * * * *